(12) United States Patent
Flottran

(10) Patent No.: US 11,597,641 B2
(45) Date of Patent: Mar. 7, 2023

(54) INDUSTRIAL TRUCK AND METHOD FOR OPERATING THE SAME

(71) Applicant: Jungheinrich AG, Hamburg (DE)

(72) Inventor: Dennis Flottran, Breitenfelde (DE)

(73) Assignee: Jungheinrich AG, Hamburg (DE)

( * ) Notice: Subject to any disclaimer, the term of this patent is extended or adjusted under 35 U.S.C. 154(b) by 393 days.

(21) Appl. No.: 16/839,201

(22) Filed: Apr. 3, 2020

(65) Prior Publication Data

US 2020/0317490 A1    Oct. 8, 2020

(30) Foreign Application Priority Data

Apr. 5, 2019   (DE) ............... 10 2019 109 007.5

(51) Int. Cl.
| | | |
|---|---|---|
| *B66F 17/00* | (2006.01) | |
| *B66F 9/075* | (2006.01) | |
| *B66F 9/24* | (2006.01) | |
| *B66F 9/12* | (2006.01) | |

(52) U.S. Cl.
CPC .......... *B66F 17/003* (2013.01); *B66F 9/0755* (2013.01); *B60G 2300/022* (2013.01); *B66F 9/12* (2013.01); *B66F 9/24* (2013.01); *G05D 2201/0216* (2013.01)

(58) Field of Classification Search
CPC ........ B66F 17/003; B66F 9/0755; B66F 9/12; B66F 9/24; B60G 2300/022; G05D 2201/0216
See application file for complete search history.

(56) References Cited

U.S. PATENT DOCUMENTS

| | | | |
|---|---|---|---|
| 5,938,710 A | 8/1999 | Lanza et al. | |
| 2013/0096735 A1* | 4/2013 | Byford | B66F 9/0755 701/28 |
| 2017/0015537 A1* | 1/2017 | Bosworth, III | B66F 9/0755 |

FOREIGN PATENT DOCUMENTS

| | | |
|---|---|---|
| DE | 102012108034 A1 | 10/2013 |
| DE | 102016109927 A1 | 11/2017 |
| EP | 0800129 A1 | 10/1997 |
| EP | 2385014 A1 | 11/2011 |

* cited by examiner

*Primary Examiner* — Tyler J Lee
*Assistant Examiner* — Yufeng Zhang
(74) *Attorney, Agent, or Firm* — Rankin, Hill & Clark LLP

(57) ABSTRACT

An industrial truck (2) and a method for operating the same. The industrial truck includes a load fork (4), a fork back (6) and a plurality of fork arms (8a, 8b), each of which include an arm tip at a free end and an arm root arranged on the fork back. The industrial truck includes a load carrier detection system for a load carrier (20, 30, 40) to be transported, which includes at least one spacing distance measurement sensor (14) provided on the load fork that is configured to detect a spacing distance between the load carrier and the fork back, and one or more monitoring sensors (10, 12) provided on the load fork configured to monitor a predetermined measurement region on the load fork. A processing unit for the sensors is configured to determine a reception of the load carrier picked up by the load fork.

19 Claims, 8 Drawing Sheets

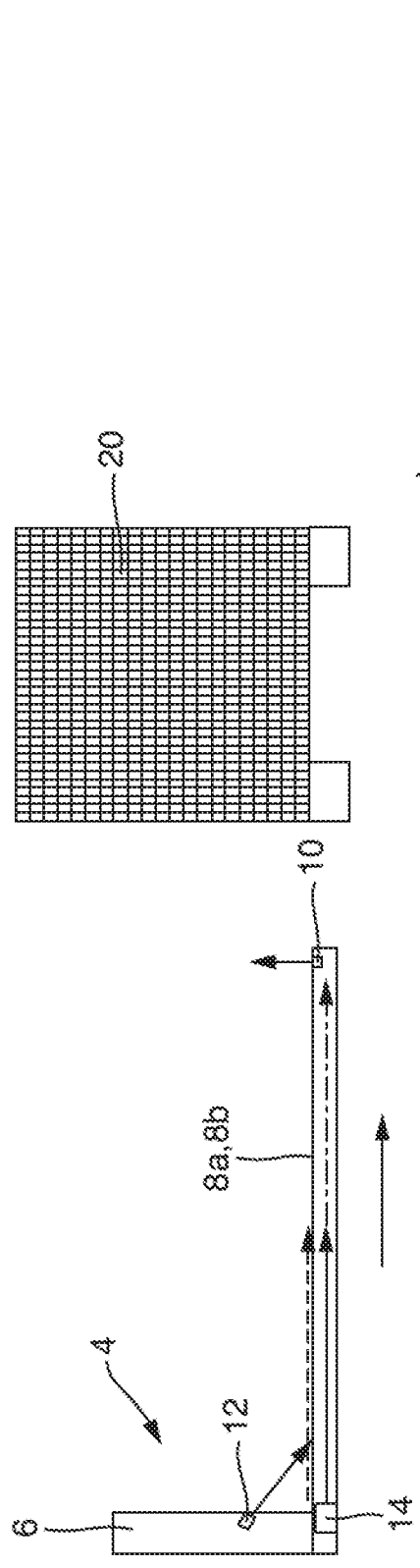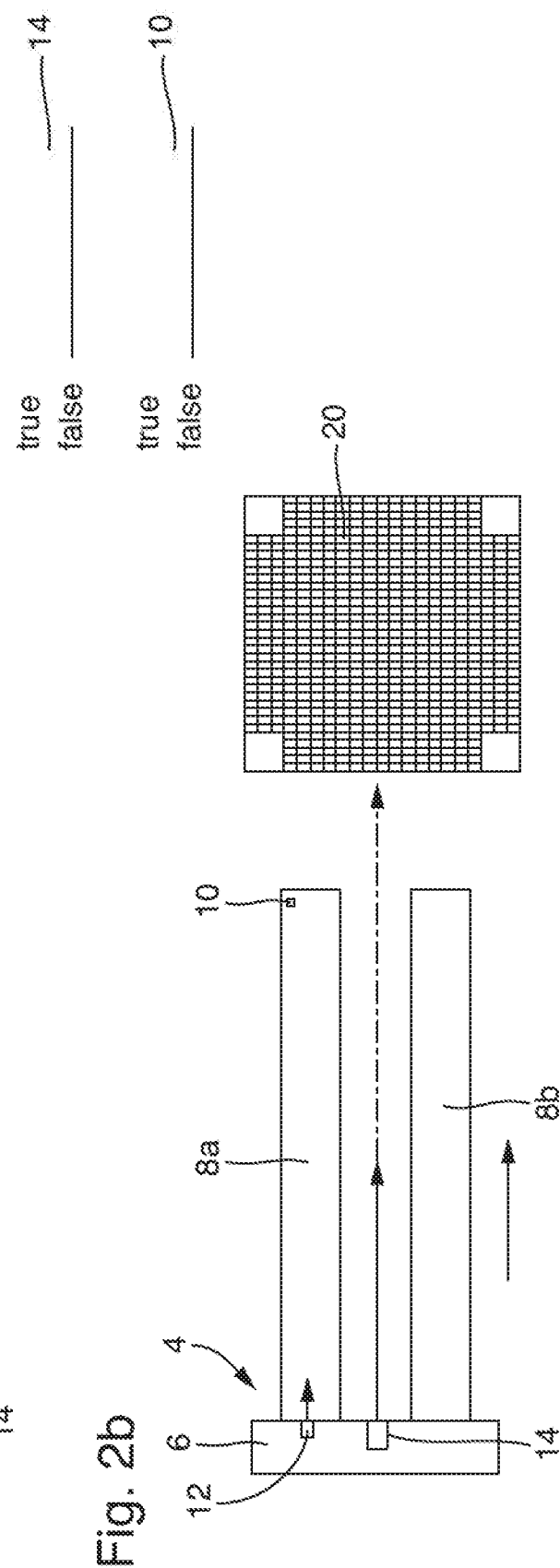

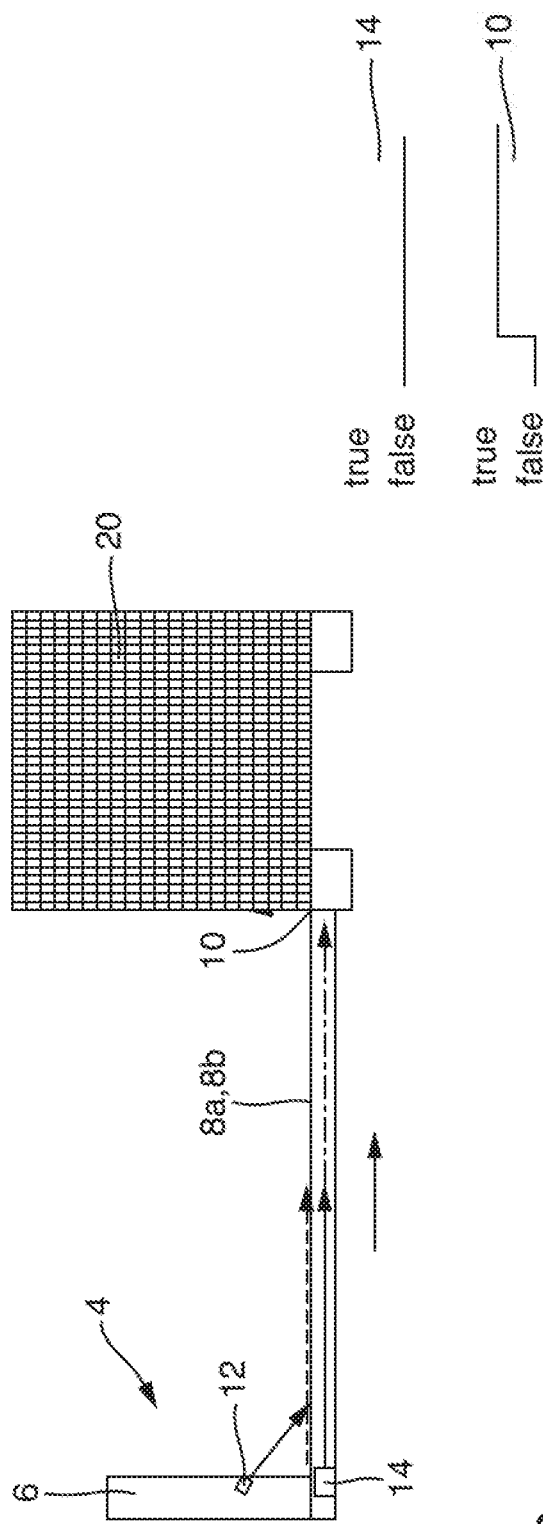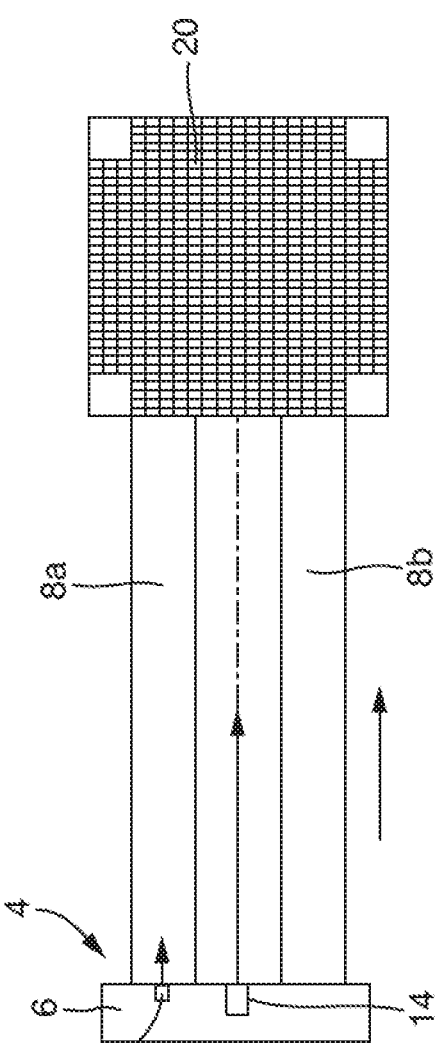

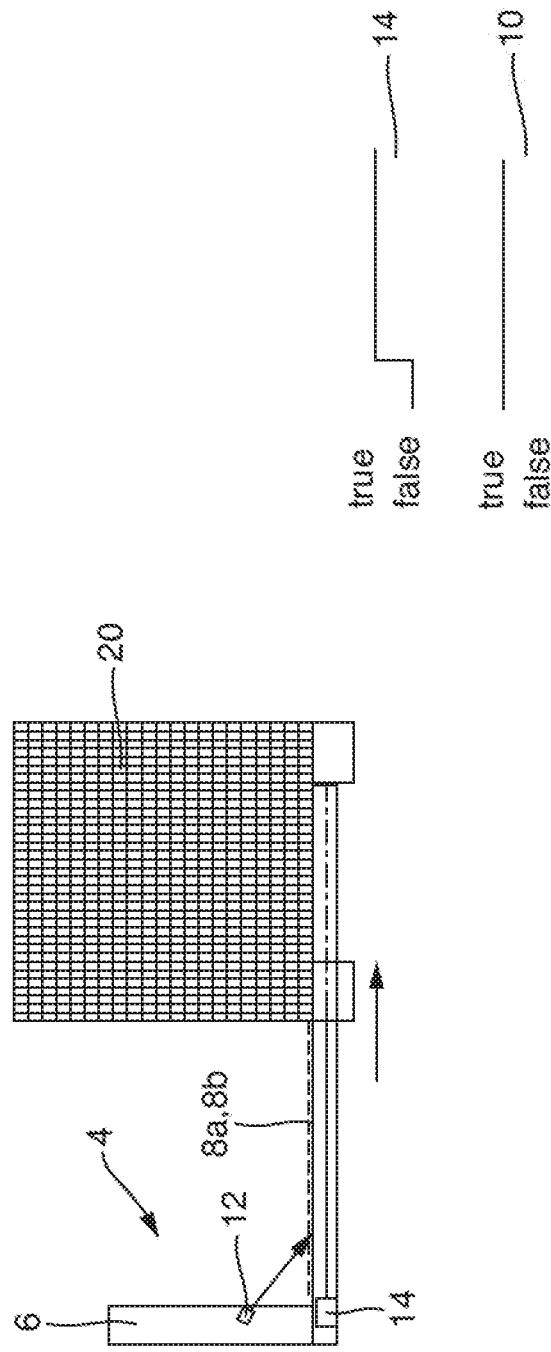
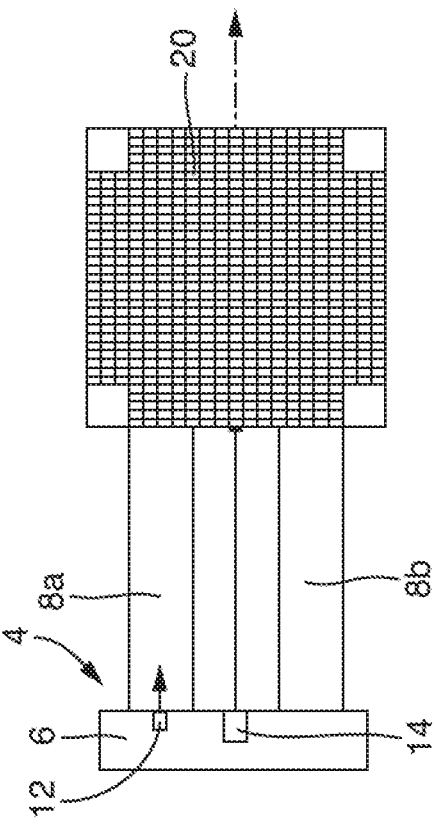

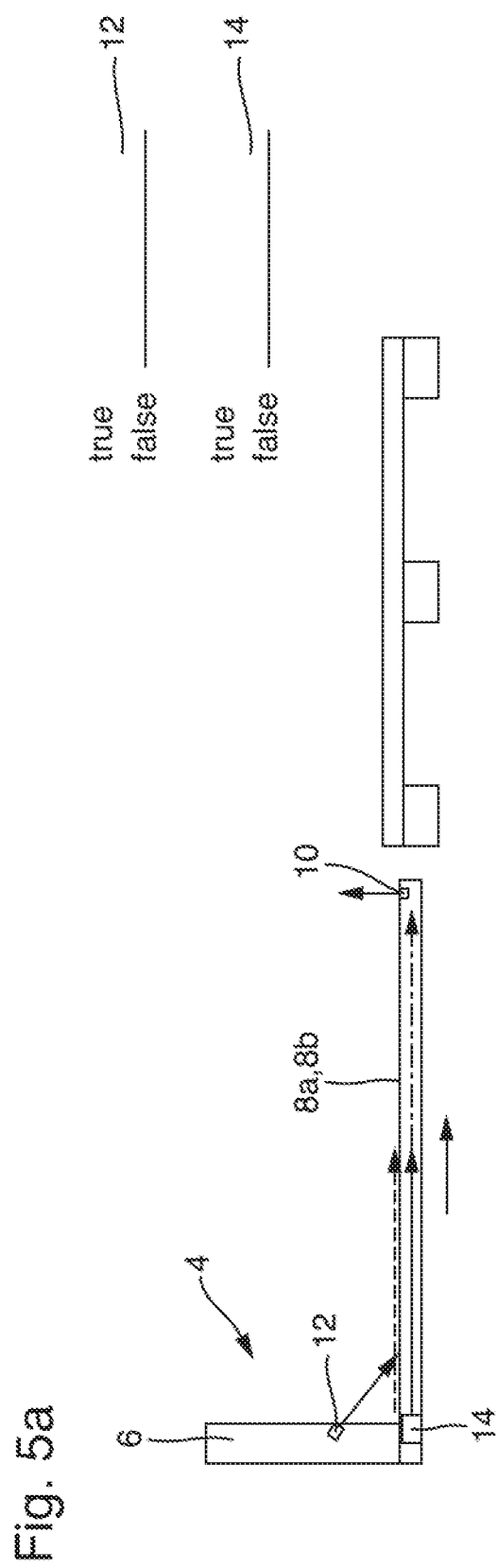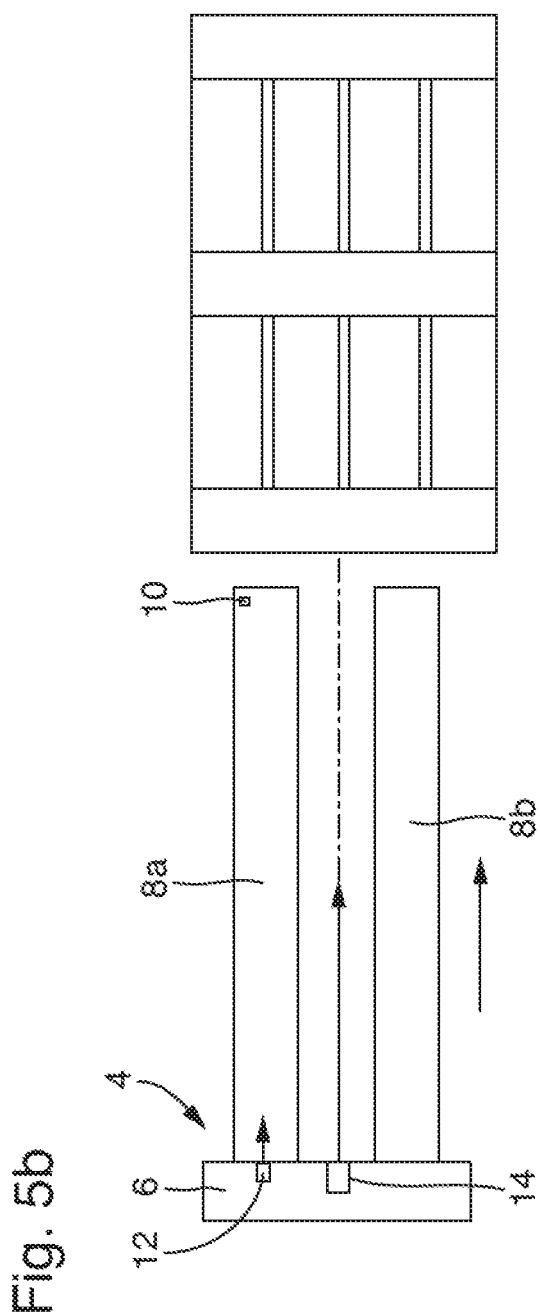

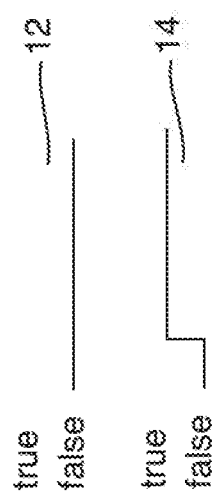
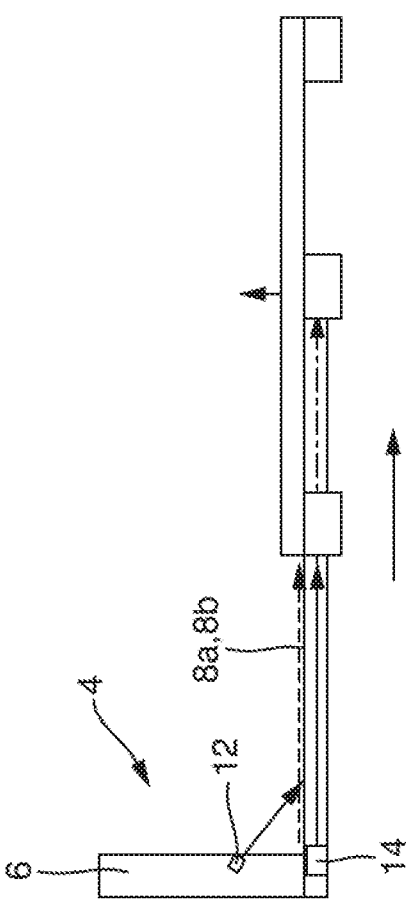
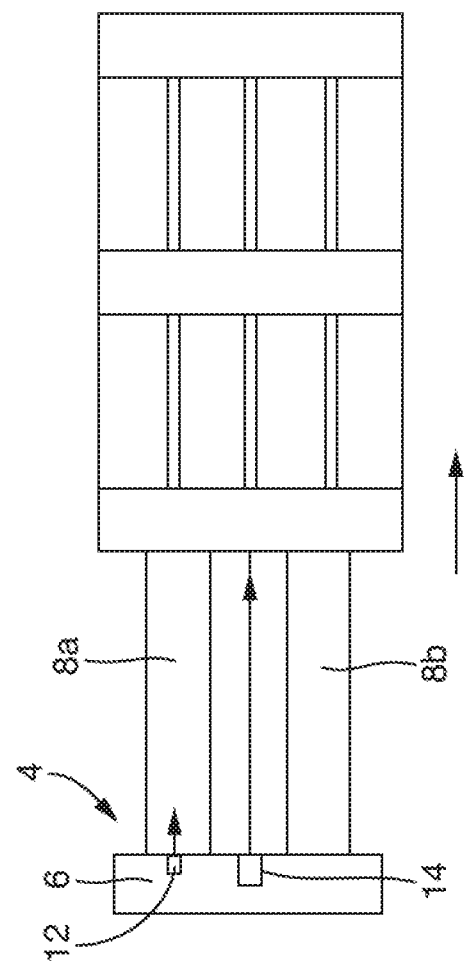

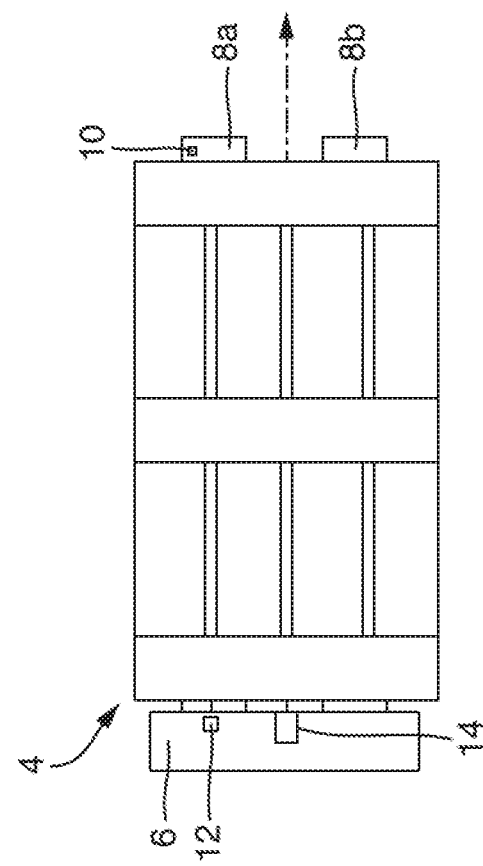
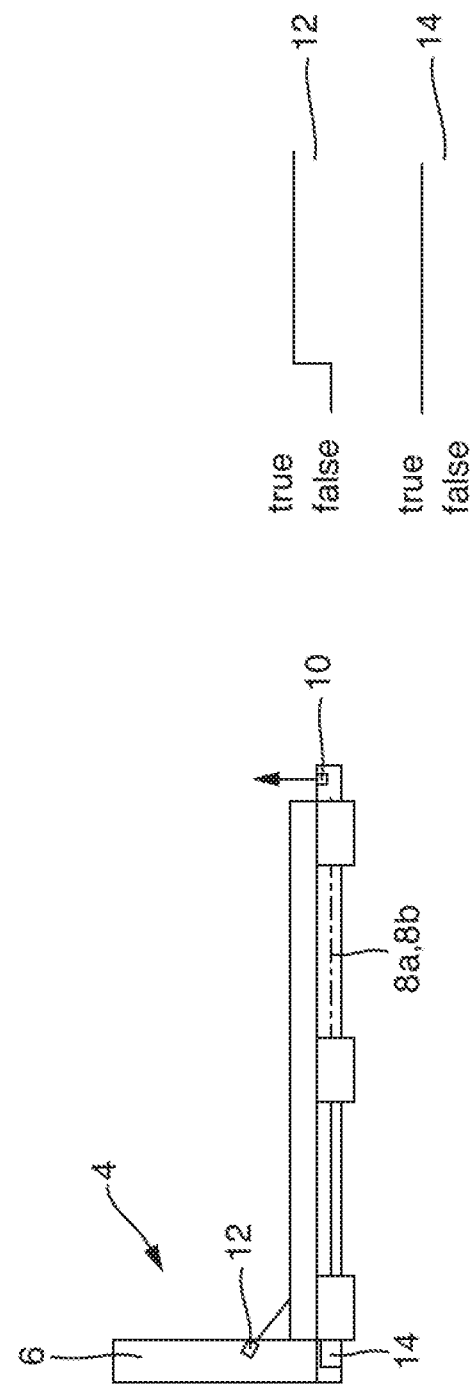

INDUSTRIAL TRUCK AND METHOD FOR OPERATING THE SAME

PRIORITY CLAIM

This application claims priority to DE 10 2019 109 007.5, filed Apr. 5, 2019.

BACKGROUND OF INVENTION

Field of Invention

The invention relates to an industrial truck comprising a load fork for picking up a load, the load fork comprising a fork back and a plurality of, in particular two, fork arms arranged on the fork back, the fork arms of the load fork each comprising an arm tip as the free end and an arm root arranged on the fork back.

The invention further relates to a method for operating an industrial truck, the industrial truck comprising a load fork for picking up a load, the load fork comprising a fork back and a plurality of, in particular two, fork arms arranged on the fork back, the fork arms of the load fork each comprising an arm tip as the free end and an arm root arranged on the fork back.

Brief Description of Related Art

Pallets or pallet cages, on which a load is situated, are often moved using industrial trucks. Picking up the pallet or the pallet cage with an industrial truck is a process that requires a high level of concentration on the part of the operator of the industrial truck. Given the subjective assessment on the part of the operator that is always necessary and the resulting potential incorrect positioning, there is always a risk of damaging the pallet or pallet cage, the load or the industrial truck.

BRIEF SUMMARY OF THE INVENTION

An object of the invention is to specify an industrial truck and a method for operating an industrial truck, whereby it is to be ensured that a pallet for transporting a load is picked up in a safe and correct manner by means of the industrial truck, in particular in automated industrial trucks.

This object is achieved by an industrial truck comprising a load fork for picking up a load, the load fork comprising a fork back and a plurality of, in particular two, fork arms arranged on the fork back, the fork arms of the load fork each comprising an arm tip as the free end and an arm root arranged on the fork back, which industrial truck is further developed in that the industrial truck comprises a load carrier detection system for a load carrier to be transported, the load carrier detection system comprising at least one spacing distance measurement sensor provided on the load fork that is configured to detect a spacing distance between the load carrier and the fork back, and at least one monitoring sensor provided on the load fork that is configured to monitor a predetermined measurement region on the load fork, and the load carrier detection system comprising a processing unit for the sensors that are connected to the processing unit, the processing unit being configured to determine a reception of the load carrier picked up by the load fork being picked up, preferably in a correct manner.

The invention is based on the idea that, by arranging a spacing distance measurement sensor and at least one monitoring sensor on the load fork, it is ensured that the load carrier is picked up on the load fork in a safe manner. Hereby, by means of the processing device it is determined, based on signals transmitted from the sensors, whether the pickup position of the load carrier corresponds to a position for transporting the load carrier and the load arranged on the load carrier. Only after determination of a correct pickup position for transportation of the load carrier a release of the industrial truck is only granted by the processing unit. For example, in this case, a corresponding notification that the load carrier and the load were picked up correctly or are positioned correctly is transmitted to the driver of the vehicle.

According to the invention, a spacing distance measurement sensor is provided on the load fork in order to detect the spacing distance between the load carrier and the fork back of the load fork. A corresponding signal is only sent by the spacing distance measurement sensor to the processing device when a minimum spacing distance between the fork back and the front face of the load carrier has been reached or when the spacing distance therebetween is less than said minimum spacing distance. In particular, the signal sent by the spacing distance measurement sensor is a release signal or state change signal.

Moreover, within the scope of the invention, at least one monitoring sensor is provided on the load fork in order to monitor a predetermined measurement region on the load fork, wherein the load carrier enters or can enter or has entered the measurement region when picked up on the load fork.

Through the combination of two, in particular several, sensors and through a combined querying of the respective sensor states, it is possible to determine a reception of the load carrier being picked up in a correct manner on the load fork or a correct pickup position of the load carrier on the load fork. It is provided that the spacing distance measurement sensor and the at least one monitoring sensor thereby cover different measurement regions. Preferably, the measurement regions are oriented transversely to the extension direction of the fork arms.

Moreover, within the scope of the invention, the measured spacing distance values between the load carrier, which is intended to be picked up on the load fork, and the fork back are continuously transmitted to the processing unit by means of the spacing distance measurement sensor when the load fork slides into the load carrier, e.g. a pallet, wherein by means of the processing unit it is determined whether the currently transmitted spacing distance measurement value is below a target value (minimum spacing distance).

Advantageously, in one embodiment, depending on the type or kind of load carrier, e.g. pallet or pallet cage, etc., different minimum spacing distances between the front face of the load carrier and the fork back have to be adhered to in order for a reception of the load carrier being picked up on the load fork in a correct manner or for a correct pickup position of the load carrier on the load fork to be determined.

A laser distance meter or a radar distance meter or an ultrasonic sensor, for example, is used as the spacing distance measurement sensor. The spacing distance measurement sensor is for example positioned on the front wall of the fork back of the industrial truck. At least the spacing distance measurement sensor is positioned on the industrial truck such that it is capable of determining the longitudinal position of the load carrier on the load fork.

In the context of the present description, an industrial truck should be understood to mean both a low-lift industrial truck and a high-lift industrial truck.

Preferably, in one embodiment, loads are picked up safely and correctly in automated or autonomously driving industrial trucks that are not steered by an operator. In the case of these industrial trucks, in addition to further requirements, certain safety requirements must also be met for correctly picking up loads.

According to another aspect, the processing device is configured to output a notification signal to an acoustic and/or optical output unit and/or to generate a release signal if a reception of the load carrier being picked up on the load fork in a correct manner or a correct pickup position of the load carrier on the load fork has been determined, such that the industrial truck is released for transporting the load carrier and/or the load fork is released for lifting or lowering on the industrial truck.

Furthermore, in one embodiment, the processing unit is configured to generate a stop signal if the processing unit determines that the load carrier has not been picked up correctly on the load fork. By means of the stop signal, the industrial truck for transporting the load carrier is braked or stopped or not released for transportation.

Further, one embodiment of the industrial truck is characterized by the fact that the spacing distance measurement sensor is arranged on the fork back between the fork arms. In particular, the spacing distance measurement sensor is designed having a digital switching output. Furthermore, the spacing distance measurement sensor is additionally or alternatively designed to be able to measure the spacing distances between the fork back and the front face of the load carrier in an analog manner.

According to an advantageous embodiment, the industrial truck is further developed in that a) the at least one monitoring sensor is arranged on the fork back, preferably above the fork arms and/or with a measurement region oriented downward onto the fork arms, and is configured to detect the presence of a load carrier in the region of the arm roots of the fork arms, or the at least one monitoring sensor is arranged in one of the fork arms in the region of the relevant arm tip, preferably with an upwardly oriented measurement region, and is configured to detect the presence of a load carrier in the region of the arm tip of the fork arm, or b) a monitoring sensor is arranged on the fork back, preferably above the fork arms and/or with a measurement region oriented downward onto the fork arms, and is configured to detect the presence of a load carrier in the region of the arm roots of the fork arms, and a monitoring sensor is arranged in one of the fork arms in the region of the relevant arm tip, preferably with an upwardly oriented measurement region, and is configured to detect the presence of a load carrier in the region of the arm tip of the fork arm.

In particular, the at least one monitoring sensor or the monitoring sensors are designed as laser probes. Within the scope of the invention, the monitoring sensor arranged on the fork back is designed as an optical sensor, wherein the measurement region of the monitoring sensor is oriented obliquely on one or more fork arms, in particular two fork arms. If the monitoring sensor is arranged on the free end of the fork arms in the region of the arm tip, the monitoring sensor is preferably designed as an optical sensor, wherein the sensor are oriented such that the measurement region points vertically upward.

Within the scope of the invention, the industrial truck, in addition to a spacing distance measurement sensor, the measurement region of which is oriented in parallel with the fork arms, also comprises a monitoring sensor on the fork back above the fork arms and an additional monitoring sensor in one of the fork arms in the region of the relevant arm tip. The respective switching outputs of the sensors and the state changes are evaluated by means of the processing unit of the load carrier detection system.

Within the scope of the invention, the sensors are active or actively operated when a load or a load carrier is picked up. Furthermore, in one embodiment, the sensors are also operated during transportation, i.e. during a journey of the industrial truck.

Furthermore, one embodiment of the industrial truck is characterized in that the spacing distance measurement sensor is configured to send a spacing distance trigger signal to the processing unit if the spacing distance between the load carrier and the fork back is less than a minimum spacing distance. The spacing distance measurement sensor thereby detects a state in which the load carrier is arranged on the load fork at the minimum spacing distance or at a shorter spacing distance than the minimum spacing distance from the fork back or the state in which the load carrier is at a greater spacing distance than the minimum spacing distance.

Moreover, the industrial truck is for example further developed in that the monitoring sensor or sensors is/are configured to send a presence trigger signal to the processing unit if the presence of the load carrier in the measurement region of the relevant monitoring sensor is detected.

Further, in one embodiment, the industrial truck is characterized in that the processing unit for the sensors is configured to determine the reception of the load carrier picked up by the load fork being picked up, preferably in a correct manner, based on the sensor signals transmitted by the spacing distance measurement sensor and the at least one monitoring sensor. In this regard, the processing unit comprises a switching logic, by means of which the reception of the load carrier being picked up on the load fork in a correct manner or the correct pickup position of the load carrier on the load fork is determined if a spacing distance trigger signal and a presence trigger signal are transmitted by both the spacing distance measurement sensor and by at least one monitoring sensor. If the load carrier or the load on the load carrier slips during transportation with the industrial truck or if at least one of the sensors no longer monitors the load carrier on the load fork during transportation, within the scope of the invention, the industrial truck is brought to a safe stop, i.e. braked or stopped. Moreover, if both or all sensors at the same time can no longer send any signal to the processing unit, the industrial truck is stopped immediately, since in this case there is no correct pickup position of the load carrier on the load fork.

According to an advantageous embodiment, the industrial truck is further developed in that the spacing distance measurement sensor is designed as a laser distance sensor and the at least one monitoring sensor is designed as a laser probe.

Further, the object is achieved by a method for operating an industrial truck, the industrial truck comprising a load fork for picking up a load carrier, the load fork comprising a fork back and a plurality of, preferably two, fork arms arranged on the fork back, the fork arms of the load fork each comprising an arm tip as the free end and an arm root arranged on the fork back, which method is further developed in that the industrial truck comprises a load carrier detection system for a load carrier to be transported, wherein a spacing distance between the load carrier and the fork back is detected by means of at least one spacing distance measurement sensor of the load carrier detection system provided on the load fork and a predetermined measurement region on the load fork is monitored by means of at least one monitoring sensor of the load carrier detection system provided on the load fork, and sensor signals being transmitted by the spacing distance measurement sensor and by the at least one monitoring sensor to a processing unit of the load carrier detection system for the sensors, which processing unit is connected to the sensors, in order to determine, by means of the sensor signals sent to the processing unit, a reception of the load carrier picked up by the load fork being picked up, preferably in a correct manner.

The same or similar advantages that were mentioned above with reference to the industrial truck itself apply to the method for operating the industrial truck, and therefore reference is explicitly made to the explanations hereinabove.

In particular, the method is further developed in that, when the spacing distance between the load carrier and the fork back is below a minimum spacing distance, a spacing distance trigger signal is sent by the spacing distance measurement sensor to the processing unit, wherein in particular the spacing distance measurement sensor is arranged between the fork arms on the fork back. Preferably, the measurement region of the spacing distance measurement sensor is oriented in parallel with the horizontally oriented fork arms in the horizontal direction.

Furthermore, in a preferred embodiment of the method, upon detection of the presence of the load carrier in the measurement region of the monitoring sensor, a presence trigger signal is sent by the at least one monitoring sensor to the processing unit.

Further, it is preferred if a monitoring sensor is arranged on the fork back, preferably above the fork arms and/or with a measurement region oriented downward onto the fork arms, and is configured to detect the presence of a load carrier in the region of the arm roots of the fork arms, and if a monitoring sensor is arranged in one of the fork arms in the region of the relevant arm tip, preferably with an upwardly oriented measurement region, and is configured to detect the presence of a load carrier in the region of the arm tip of the fork arm, wherein a presence trigger signal is sent by the monitoring sensor to the processing unit each time upon the detection of the presence of the load carrier in the measurement region of the relevant monitoring sensor.

According to an advantageous embodiment, the method is further developed in that the reception of the load carrier picked up by the load fork being picked up is determined depending on the type of the load carrier to be picked up and/or depending on the geometry of the load carrier to be picked up, wherein in particular information data relating to the load carrier to be picked up and/or relating to the geometry of the load carrier to be picked up in each case are transmitted to the processing unit in particular by a, preferably central, control unit.

In this regard, within the scope of the invention, corresponding information data relating to a load carrier that is to be transported with an industrial truck are transmitted for example by a central control unit of a goods logistics facility, corresponding individual information relating to the load carrier hereby being transmitted to the processing unit. This may for example be data relating to the type of load carrier, e.g. pallet or pallet cage, etc., or to the geometry or geometric dimensions of the relevant load carrier. Depending on said information, within the scope of the invention, a different horizontal spacing distance between the fork back and the front face of the pallet has to be adhered to when picking up a pallet on the load fork than in the case of picking up a pallet cage, for example. Depending on the type or kind of load carrier, within the scope of the invention, different minimum spacing distances have to be adhered to for different load carrier types to be picked up safely on the load fork. The minimum spacing distance for safe pickup detected or recorded by means of the spacing distance measurement sensor may vary depending on the load or load carrier to be picked up. Further, within the scope of the invention, the minimum spacing distances for different loads are accordingly, preferably individually, set or taught in during commissioning of the industrial truck.

In particular, in one embodiment, the minimum spacing distance for one or more load carriers is stored in a, preferably central, control unit or several minimum spacing distances for several load carriers are stored in a, preferably central, control unit. The minimum spacing distance values for the spacing distance measurement sensor that are characteristic of one or more load carriers to be picked up are stored by the control unit, for example of a or the goods logistics facility, in the control unit, such that safe pickup of the load carrier is made possible. In one embodiment, said minimum spacing distance values are accordingly transmitted by the control unit to the spacing distance measurement sensor.

Moreover, in one embodiment of the method, the load carrier detection system is operated, preferably at regular time intervals, after a load carrier has been picked up correctly on the load fork during transportation of the load carrier by means of the industrial truck. In this way, it is ensured that a safe pickup position of the load carrier is guaranteed even during transportation of the load carrier and the load arranged thereon. If the load carrier detection system determines that, for example, the horizontal minimum spacing distance between the fork back and the load carrier is no longer being adhered to, the processing unit can intervene in the control of the industrial truck and for example brake or stop same.

Furthermore, according to an embodiment of the method, during an empty run of the industrial truck, the load carrier detection system and/or the spacing distance measurement sensor and/or the at least one monitoring sensor is/are not operated.

Advantageously, in an embodiment of the method, when the load carrier is picked up on the load fork and/or when the load carrier is dropped off by the load fork at a drop-off point, the distance between the load carrier and the load fork, in particular fork back, is measured by means of the spacing distance measurement sensor and, at the same time, the distance traveled by the industrial truck in relation to the load carrier is detected. If, for example, it is determined that the distance traveled by the industrial truck, which is for example detected by means of a sensor, differs from the measured distance between the load carrier and the load fork or fork back during pickup of the load carrier or during drop-off of the load carrier, the processing unit thus determines that the load carrier is not correctly arranged on the load fork. As a result, an error signal is generated and the industrial truck is stopped accordingly.

In one embodiment of the method, after the load carrier is set down, the spacing distance between the set-down load carrier and the spacing distance measurement sensor is detected by means of the spacing distance measurement sensor and the distance traveled by the industrial truck is detected, for example by means of a sensor, after the load carrier is set down and the detected spacing distance is compared with the distance traveled by the industrial truck. If it is determined, after the load carrier is set down, that the measurement values for the spacing distance detected by the spacing distance measurement sensor and for the distance traveled differ, a message or a notification that the load carrier was dropped off incorrectly can be generated and/or the industrial truck is stopped.

Moreover, according to another aspect, monitoring is also carried out with regard to whether the measured spacing distance between the industrial truck and the set-down load increases relative to the distance traveled by the industrial truck after a load is set down. In the event of a corresponding deviation between the measured spacing distance and the distance traveled, it can be determined that the load is being dragged along when the fork arms are being pulled out or in another way, as a result of which a warning message is preferably generated and/or the industrial truck is stopped.

Moreover, one embodiment of the method is characterized in that, upon receipt of a spacing distance trigger signal from the spacing distance measurement sensor and upon receipt of a presence trigger signal from the at least one monitoring sensor, the reception of a load carrier being picked up on the load fork in a correct manner is determined by the processing unit.

In another embodiment, the method is further developed in that, upon receipt of a presence trigger signal from a first monitoring sensor or upon receipt of a second presence trigger signal from a second monitoring sensor, the reception of a load carrier being picked up on the load fork in a correct manner is determined by the processing unit. Therefore, the reception of a load carrier being picked up in a correct manner is determined by means of two monitoring sensors, wherein the monitoring sensors each generating a corresponding presence trigger signal.

Further features of the invention will become apparent from the description of embodiments according to the invention together with the claims and the attached drawings. Embodiments according to the invention can fulfill individual features or a combination of several features.

Within the scope of the invention, features which are designated by "in particular" or "preferably" are understood to be optional features.

BRIEF DESCRIPTION OF THE DRAWINGS

The invention is described below, without restricting the general idea of the invention, based on exemplary embodiments in reference to the drawings, whereby we expressly refer to the drawings with regard to all details according to the invention that are not explained in greater detail in the text. In the figures:

FIG. 2a, 2b each show simplified schematic views of a load fork of the industrial truck for picking up a pallet cage according to a first step;

FIG. 3a, 3b each show simplified schematic views of a load fork of the industrial truck for picking up a pallet cage according to a second step;

FIG. 4a, 4b each show simplified schematic views of a load fork of the industrial truck for picking up a pallet cage according to a third step;

FIG. 5a, 5b each show simplified schematic views of a load fork of the industrial truck for picking up a pallet according to a first step;

FIG. 6a, 6b each show simplified schematic views of a load fork of the industrial truck for picking up a pallet cage according to a second step;

FIG. 7a, 7b each show simplified schematic views of a load fork of the industrial truck for picking up a pallet according to a third step;

In the drawings, the same or similar elements and/or parts are provided with the same reference numbers in order to prevent the item from needing to be reintroduced.

DETAILED DESCRIPTION OF THE INVENTION

Figure 1A:
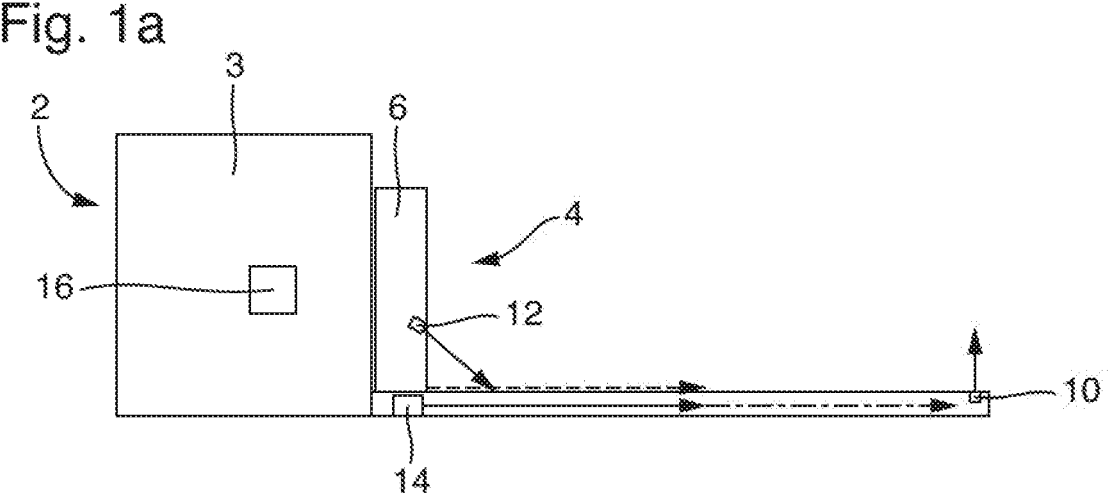
FIG. 1a, 1b each show simplified schematic views of an industrial truck.
Figure 1B:
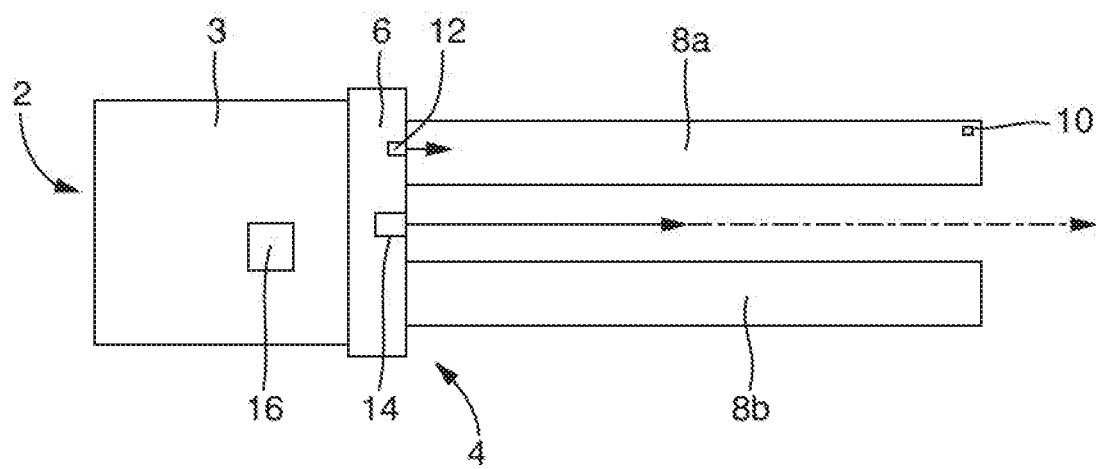

FIG. 1a shows a schematic side view of a schematically represented industrial truck 2. FIG. 1b shows a schematic plan view of the industrial truck 2. The industrial truck 2 comprises a schematically represented drive portion 3, on which a load fork 4 is arranged. The load fork 4 is preferably vertically adjustable in height. By means of the load fork 4, loads or load carriers such as a pallet cage (cf. FIGS. 2a to 4b) or a pallet (cf. FIGS. 5a to 7b) are picked up.

The load fork 4 comprises a fork back 6 which is arranged on the drive portion 3 and on which fork arms 8a, 8b are arranged on the lower side 2. The fork arms 8a, 8b extend in a horizontal direction. On the free end facing away from the fork back 6, the fork arm 8a comprises a laser probe 10 as the sensor or monitoring sensor on the arm tip. The laser probe 10 is arranged on the arm tip of the fork arm 8a such that the measurement field of the laser probe 10 points upward in a vertical direction. This is indicated in FIG. 1a by a vertical arrow pointing up.

A laser probe 12 as the monitoring sensor or sensor is arranged on the fork back 6 above the fork arms 8a, 8b. The laser probe 12 is oriented such that the measurement field thereof points obliquely downward toward the fork arm 8a and covers a region in the root region of the fork arm 8a on the fork back 6.

Furthermore, a laser distance measuring sensor 14 is arranged at the height of the fork arms 8a, 8b on the fork back 6 in the region between the fork arms 8a, 8b. By means of the laser distance measuring sensor 14, the horizontal distance between a load carrier, which is or has been picked up on the load fork 4, and the fork back 6 or the front face of the fork back 6 is detected or measured.

The laser probes 10, 12 and the laser distance measuring sensor 14 are arranged on the load fork 4 such that each of said sensors covers different measurement regions on the load fork 4. The region between the fork arms 8a, 8b is detected by means of the laser distance measuring sensor 14.

Inside the drive portion 3, the industrial truck 2 comprises a processing unit 16, which is connected or coupled to the laser probes 10, 12 and to the laser distance measuring sensor 14. Depending on the switching state of the laser probes 10, 12 and of the laser distance measuring sensor 14, corresponding signals are transmitted by the sensors to the processing unit 16. The processing unit 16 determines, based on the signals transmitted by the laser probes 10, 12 and the laser distance measuring sensor 14, whether a load carrier picked up on the load fork 4 has assumed a correct pickup position. The processing unit 16 may for example be a computer, microcontroller or the like. Furthermore, within the scope of the invention, the processing unit 16 is also implemented as a component of a controller of the industrial truck 2.

In the following, the receptions of various load carriers being picked up on the load fork 4 in a safe manner will be explained by way of example based on the schematic exemplary embodiments in FIGS. 2a to 4b and in FIGS. 5a to 7b.

In the first exemplary embodiment according to FIGS. 2*a* to 4*b*, a pallet cage 20 is arranged on the load fork 4. In this regard, the figures show different steps for picking up the pallet cage 20 on the load fork 4 when the load fork 4 approaches the pallet cage 20.

FIG. 2*a*, 2*b* show a side view and a plan view of the load fork 4 and the pallet cage 20, wherein the load fork 4 and the pallet cage 20 are spaced apart from one another. When the industrial truck 2 drives into the free space below the pallet cage 20, firstly the arm tips of the fork arms 8A, 8B are brought nearer. In the process, the laser probe 10 on the arm tip of the fork arm 8*a* and the laser distance measuring sensor 14 are operated.

The switching states of the laser probe 10 and of the laser distance measuring sensor 14 are shown schematically in the right-hand region of FIG. 2*a*, 2*b*. In this case, both the laser probe 10 and the laser distance measuring sensor 14 are in the "false" state. These states are transmitted by the laser probe 10 and the laser distance measuring sensor 14 to the processing unit 16 (cf. FIG. 1*a*, 1*b*).

When the load fork 4 approaches the pallet cage 20 (cf. FIG. 3*a*, 3*b*), the laser probe 10 detects that the pallet cage 20 has entered the measurement region of the laser probe 10, and therefore the state of the laser probe 10 changes from the "false" state to the "true" state. This state change of the laser probe 10 is transmitted to the processing unit 16. As a result, the processing unit 16 recognizes that the pallet cage 20 is located above the arm tip of the fork arms 8*a*, 8*b*. At the same time, the horizontal spacing distance between the laser distance measuring sensor 14 or fork back 6 and the front face of the pallet cage 20 facing the laser distance measuring sensor 14 is detected or measured by the laser distance measuring sensor 14. When the fork arms 8*a*, 8*b* (cf. FIG. 3*a*, 3*b*) are inserted underneath the pallet cage 20, a or the minimum horizontal spacing distance between the fork back 6 and the pallet cage 20 on the load fork 4 for a safe or correct pickup position of the pallet cage has not yet been reached. Therefore, the state of the laser distance measuring sensor 14 is, as before, "false".

The laser distance measuring sensor 14 designed as the spacing distance sensor or the measurement region of the laser distance measuring sensor 14 is oriented such that the spacing distance from the load to be picked up, from the load carrier, i.e. from the pallet cage 20 or a pallet 30 (cf. FIGS. 5*a* to 7*b*) can be reliably detected. The laser distance measuring sensor 14 is hereby preferably arranged so as to be adjustable in height, such that the laser distance measuring sensor 14 can be oriented onto a discernible edge of the pallet cage 20 or of the corresponding load carrier.

When the horizontal spacing distance between the fork back 6 and the pallet cage 20 (cf. FIG. 4*a*, 4*b*) shortens, the laser distance measuring sensor 14 determines that the minimum spacing distance between the fork back 6 and the pallet cage 20 has been reached, and therefore the state of the laser distance measuring sensor 14 changes to the "true" state. This change of state of the laser distance measuring sensor 14 is transmitted to the processing unit 16. Since a state change was sent as a signal to the processing unit 16 by both the laser probe 10 and the laser distance measuring sensor 14 upon arrangement of the pallet cage 20 on the load fork 4, the processing unit 16 determines that the pallet cage 20 is in a correct pickup position on the load fork 4 for transportation. The industrial truck 2 can then be stopped and the load fork 4 can be lifted up together with the pallet cage 20 picked up in a correct manner.

In one embodiment (not shown), the laser probe 12 on the fork back 6 is used and operated for the pickup operation instead of the laser probe 10 when the pallet cage 20 is picked up. The pallet cage 20 is in this case picked up in the region of the fork back 6.

In the exemplary embodiment according to FIGS. 5*a* to 7*b*, a pallet 30 is arranged on the load fork 4 as the load carrier. In contrast to the exemplary embodiment in FIGS. 2*a* to 4*b*, when the pallet 30 is arranged on the load fork 4, the laser probe 12 arranged on the fork back 6 and the laser distance measuring sensor 14 are operated at the same time. The laser probe 10 provided on the arm tip of the fork arm 8*a* is not active in this case.

When the load fork 4 approaches the pallet 30, the laser probe 12 and the laser distance measuring sensor 14 are both initially in the "false" state (cf. FIG. 5*a*). When the fork arms 8*a*, 8*b* are inserted underneath the pallet 30, the horizontal spacing distance between the fork back 6 or laser distance measuring sensor 14 and the front face of the pallet 30 facing the fork back 6 is measured or detected by means of the laser distance measuring sensor 14. When a minimum spacing distance for the pallet 30 on the load fork 4 detected by means of the laser distance measuring sensor 14 is reached, the state of the laser distance measuring sensor 14 changes from the "false" state to the "true" state. This state change is transmitted to the processing unit 16. Since the pallet 30 is not yet within the measurement region of the laser probe 12, the state of the laser probe 12 is still "false".

The minimum spacing distance for the pallet 30 differs from the minimum spacing distance for the pallet cage 20 in both exemplary embodiments. Within the scope of the invention, it is possible for the same minimum spacing distance for safe pickup on the load fork 4 to be adhered to for both the pallet 30 and the pallet cage 20. For example, both the pallet cage 20 and the pallet 30 (cf. FIG. 7*a*, 7*b*) may be picked up directly at the fork back 6.

If the pallet 30 enters the measurement region of the laser probe 12, the state of the laser probe 12 changes to the "true" state (cf. FIG. 7*a*, 7*b*). The state change of the laser probe 12 is transmitted to the processing unit 16 as a signal, such that, based on the two state changes of the laser probe 12 and the laser distance measuring sensor 14, the processing unit 16 determines that the pallet 30 is arranged in the correct pickup position on the load fork 4 for transportation by means of the industrial truck 2.

Depending on the type of load carrier, for example a pallet cage or pallet, according to the invention, various sensors are combined with one other. In the case of the exemplary embodiment according to FIGS. 2*a* to 4*b*, the laser probe 10 arranged on the arm tip of the fork arm 8*a* and the laser distance measuring sensor 14 are operated, whereas in the exemplary embodiment according to FIGS. 5*a* to 7*b*, the laser probe 12 arranged on the fork back 6 and the laser distance measuring sensor 14 are operated.

Figure 8A:
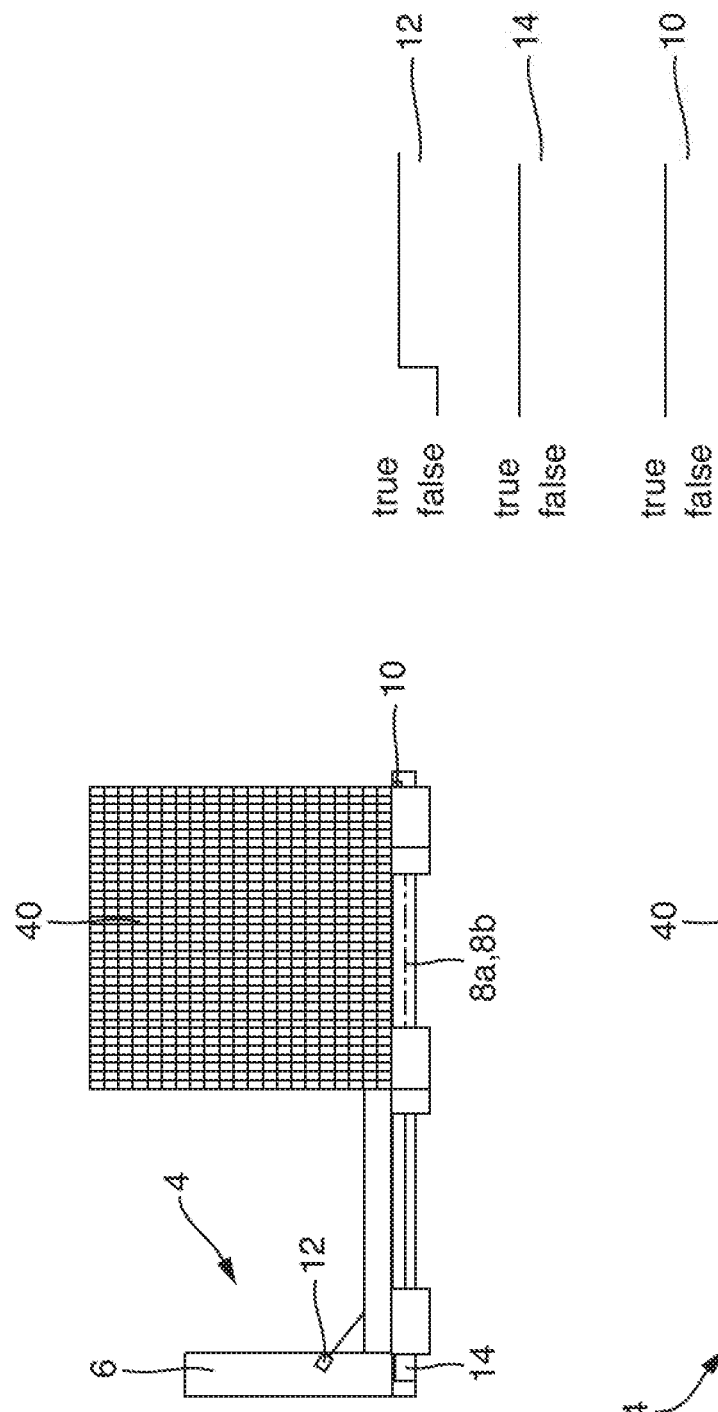
FIG. 8a, 8b each show simplified schematic views of a load fork of the industrial truck with a picked-up mixed pallet.
Figure 8B:
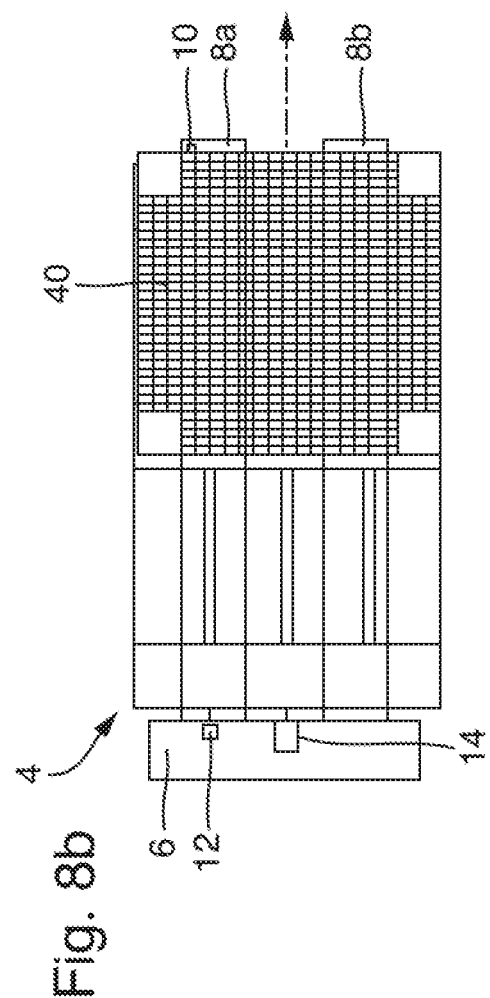

In the exemplary embodiment from FIG. 8*a*, 8*b*, a mixed pallet 40 is arranged on the load fork 4, wherein the laser probe 10 on the arm tip of the fork arm 8*a*, the laser probe 12 on the fork back 6 and the laser distance measuring sensor 14 are operated in this example, wherein the state changes of said sensors in each case are transmitted to the processing unit 16 such that the correct transport position of the mixed pallet 40 is determined.

When the mixed pallet 40, which consists of various load carriers, e.g. a pallet and a pallet cage, is picked up on the load fork 4, both laser probes 10, 12 are operated at the same time.

Within the scope of the invention, the industrial truck 2 is only enabled for transportation and operation after automatic determination of a load carrier, for example a pallet or pallet cage, etc., being picked up in the correct manner or being in the correct transport position on the load fork 4. Equally, according to another aspect, the position of the load carrier is monitored by means of the sensors when the load carrier is picked up on the load fork 4 during driving operation of the industrial truck 2, for example. If, in this case, a state change on account of a position change of the load carrier on the load fork 4 is transmitted by at least one of the sensors (laser probe 10, laser probe 12, laser distance measuring sensor 14) to the processing unit 16, the industrial truck 2 is braked or stopped. Further, the position change of the load carrier on the load fork 4 may also be displayed as a fault, for example. Equally, after the pallet or load carrier has been set down, the laser distance measuring sensor designed as the spacing distance sensor can monitor whether the pallet or load carrier has been set down correctly.

Moreover, according to the invention, different loads can be taken at the fork tip and at the fork back, wherein the laser probe 10 in combination with the laser distance measuring sensor 14 are operated as the sensors when, for example, a load carrier is picked up at the fork tip (cf. FIGS. 2a to 4b) and the laser probe 10 is not required when another load carrier is picked up at the fork back and, instead, the laser probe 12 and the laser distance measuring sensor 14 are operated (cf. FIGS. 5a to 7b).

All named features, including those taken from the drawings alone and also individual features which are disclosed in combination with other features, are considered alone and in combination as essential for the invention. Embodiments according to the invention can be fulfilled by individual features or a combination of several features.

LIST OF REFERENCE CHARACTERS
APPEARING IN THE DRAWING FIGURES

2 Industrial truck
3 Drive portion
4 Load fork
6 Fork back
8a, 8b Fork arms
10 Laser probe
12 Laser probe
14 Laser distance measuring sensor
16 Processing unit
20 Pallet cage
30 Pallet
40 Mixed pallet

What is claimed is:

1. An industrial truck for transporting a load carrier, the industrial truck comprising:
   a load fork for picking up the load carrier; and
   a load carrier detection system for the load carrier;
   wherein the load fork comprises a fork back and a plurality of fork arms arranged on the fork back,
   wherein each of the plurality of fork arms comprises an arm tip at a free end and an arm root arranged on the fork back,
   wherein the load carrier detection system comprises
      a spacing distance measurement sensor provided on the load fork that is configured to detect a spacing distance between the load carrier and the fork back,
      at least one monitoring sensor arranged in a respective one of the plurality of fork arms in a region of the arm tip of the respective one of the plurality of fork arms, the at least one monitoring sensor having an upwardly oriented measurement region configured to detect a presence of the load carrier in a region of the arm roots of the plurality of fork arms, and
      a processing unit,
   wherein the spacing distance measuring sensor and the monitoring sensor are connected to the processing unit, and
   wherein the processing unit is configured to determine a reception of the load carrier as the load carrier is being picked up by the load fork.

2. The industrial truck according to claim 1, wherein the spacing distance measurement sensor is arranged on the fork back between the fork arms.

3. The industrial truck according to claim 1, further comprising an additional monitoring sensor arranged on the fork back having a measurement region oriented downward onto the plurality of fork arms, which is also configured to detect the presence of the load carrier in the region of the arm roots of the plurality of fork arms.

4. The industrial truck according to claim 1, wherein the spacing distance measurement sensor is configured to send a spacing distance trigger signal to the processing unit when the spacing distance between the load carrier and the fork back is less than a minimum spacing distance.

5. The industrial truck according to claim 1, wherein the monitoring sensor is configured to send a presence trigger signal to the processing unit when the presence of the load carrier in the region of the arm roots of the plurality of fork arms is detected.

6. The industrial truck according to claim 1, wherein the processing unit for the spacing distance measurement sensor and the monitoring sensor is configured to determine the reception of the load carrier as the load carrier is being picked up by the load fork based on sensor signals transmitted by the spacing distance measurement sensor and the monitoring sensor.

7. The industrial truck according to claim 1, wherein the spacing distance measurement sensor is a laser distance sensor and the monitoring sensor is a laser probe.

8. A method for operating an industrial truck that includes a load fork for picking up a load carrier, the load fork having a fork back and a plurality of fork arms arranged on the fork back, each of the plurality of fork arms having an arm tip at a free end and an arm root arranged on the fork back, the method comprising:
   detecting a spacing distance between the load carrier and the fork back with a spacing distance measurement sensor of a load carrier detection system provided on the load fork; and
   monitoring a predetermined measurement region on the load fork with at least one monitoring sensor of the load carrier detection system, said at least one monitoring sensor being arranged in a respective one of the plurality of fork arms in a region of the arm tip of the respective one of the plurality of fork arms, the at least one monitoring sensor having an upwardly oriented measurement region configured to detect a presence of the load carrier in a region of the arm roots of the plurality of fork arms;
   wherein sensor signals are transmitted by the spacing distance measurement sensor and by the monitoring sensor to a processing unit of the load carrier detection system, and
   wherein the processing unit is configured to determine, based on signals sent to the processing unit by the spacing distance measurement sensor and the monitoring sensor, a reception of the load carrier being picked up by the load fork.

9. The method according to claim 8, wherein when the spacing distance between the load carrier and the fork back is below a minimum spacing distance, a spacing distance trigger signal is sent by the spacing distance measurement sensor to the processing unit.

10. The method according to claim 8, wherein upon detection of the presence of the load carrier in the measurement region of the monitoring sensor, a presence trigger signal is sent by the monitoring sensor to the processing unit.

11. The method according to claim 8, wherein the load carrier detection system further comprises an additional monitoring sensor arranged on the fork back, which has a measurement region oriented downward onto the fork arms, and which is also configured to detect the presence of the load carrier in the region of the arm roots of the plurality of fork arms.

12. The method according to claim 8, wherein the reception of the load carrier being picked up by the load fork is determined depending on a type of the load carrier being picked up and/or depending on a geometry of the load carrier being picked up.

13. The method according to claim 9, wherein a minimum spacing distance for the load carrier or several different minimum spacing distances for several different respective load carriers is/are stored in a control unit.

14. The method according to claim 8, wherein the load carrier detection system is operated after the load carrier has been picked up correctly on the load fork during transportation of the load carrier by the industrial truck.

15. The method according to claim 8, wherein, during an empty run of the industrial truck, the load carrier detection system and/or the spacing distance measurement sensor and/or the monitoring sensor is/are not operated.

16. The method according to claim 8, wherein, when the load carrier is picked up on the load fork and/or when the load carrier is dropped off by the load fork at a drop-off point, a distance between the load carrier and the load fork is measured by the spacing distance measurement sensor and, at the same time, a distance traveled by the industrial truck in relation to the load carrier is detected.

17. The method according to claim 8, wherein, after the load carrier is set down, the spacing distance between the set-down load carrier and the spacing distance measurement sensor is detected by the spacing distance measurement sensor, and a distance traveled by the industrial truck is detected after the load carrier is set down and the detected spacing distance is compared with the distance traveled by the industrial truck.

18. The method according to claim 8, wherein, upon receipt of a spacing distance trigger signal from the spacing distance measurement sensor and upon receipt of a presence trigger signal from the monitoring sensor, the reception of the load carrier being picked up on the load fork in a correct manner is determined by the processing unit.

19. The method according to claim 8, wherein, upon receipt of a presence trigger signal from the monitoring sensor or upon receipt of a second presence trigger signal from an additional monitoring sensor, the reception of a load carrier being picked up on the load fork in a correct manner is determined by the processing unit.

* * * * *